(12) United States Patent
Choi et al.

(10) Patent No.: US 9,155,999 B2
(45) Date of Patent: *Oct. 13, 2015

(54) NON-PGM CATALYST FOR BURNING CARBON SOOT, AND FILTRATION FILTER AND EXHAUST GAS POST-PROCESSING APPARATUS USING THE SAME

(71) Applicants: Hyundai Motor Company, Seoul (KR); Heesung Catalysts Corporation, Siheung, Gyeonggi-Do (KR)

(72) Inventors: Sung Mu Choi, Gyeonggi-do (KR); Jung Min Seo, Gyeonggi-do (KR); Hyun Sik Han, Gyeonggi-do (KR); Eun Seok Kim, Gyeonggi-do (KR); Jeong Bae Lee, Gyeonggi-do (KR)

(73) Assignees: Hyundai Motor Company, Seoul (KR); Heesung Catalysts Corporation, Siheung, Gyeongg-Do (KR)

( * ) Notice: Subject to any disclaimer, the term of this patent is extended or adjusted under 35 U.S.C. 154(b) by 256 days.

This patent is subject to a terminal disclaimer.

(21) Appl. No.: 13/645,064

(22) Filed: Oct. 4, 2012

(65) Prior Publication Data
US 2013/0089472 A1    Apr. 11, 2013

Related U.S. Application Data

(63) Continuation-in-part of application No. 13/326,570, filed on Dec. 15, 2011.

(30) Foreign Application Priority Data

Oct. 10, 2011  (KR) .................. 10-2011-0103319

(51) Int. Cl.
*B01J 23/10* (2006.01)
*B01D 53/94* (2006.01)
(Continued)

(52) U.S. Cl.
CPC .............. *B01D 53/944* (2013.01); *B01J 23/66* (2013.01); *B01J 23/894* (2013.01); *B01J 35/023* (2013.01);
(Continued)

(58) Field of Classification Search
None
See application file for complete search history.

(56) References Cited

U.S. PATENT DOCUMENTS

| 7,875,572 B2 | 1/2011 | Kikuhara et al. | |
| 2007/0059223 A1* | 3/2007 | Golunski et al. | 422/180 |

(Continued)

FOREIGN PATENT DOCUMENTS

| JP | 2010005580 A | 1/2010 | |
| WO | WO 2009139107 A1 * | 11/2009 | 502/304 |

OTHER PUBLICATIONS

Sciré et al, "Catalytic combustion of volatile organic compounds over group IB metal catalysts on Fe2O3", Catalysis Communications, vol. 2, pp. 229-232 (2001).

(Continued)

*Primary Examiner* — Walter D Griffin
*Assistant Examiner* — Jelitza Perez
(74) *Attorney, Agent, or Firm* — Mintz Levin Cohn Ferris Glovsky and Popeo, P.C.; Peter F. Corless (57) ABSTRACT

The present invention provides a non-PGM catalyst for burning carbon soot without using a noble metal, the non-PGM catalyst comprising: a cerium-praseodymium complex oxide and an iron oxide, the cerium-praseodymium complex oxide impregnated with silver (Ag). The cerium-praseodymium complex oxide illustratively consists of 60 to 95 wt % of cerium oxide and 5 to 40 wt % of praseodymium oxide, and silver (Ag) impregnated in the complex oxide is 1.5 to 3.0 parts by weight of the total weight of the complex oxide. The iron oxide may be an oxide in a form of particles separate from the cerium-praseodymium complex oxide in which silver is impregnated, and may be 0.5 to 2 parts by weight of the total weight of the cerium praseodymium complex oxide.

2 Claims, 5 Drawing Sheets

(51) Int. Cl.
- *B01J 23/66* (2006.01)
- *F01N 3/035* (2006.01)
- *B01J 23/89* (2006.01)
- *B01J 35/02* (2006.01)
- *B01J 35/04* (2006.01)
- *B01J 37/00* (2006.01)
- *B01J 37/02* (2006.01)

(52) U.S. Cl.
CPC .............. *B01J 35/04* (2013.01); *B01J 37/0009* (2013.01); *B01J 37/0201* (2013.01); *B01J 37/0215* (2013.01); *F01N 3/035* (2013.01); *B01D 53/9477* (2013.01); *B01D 2255/104* (2013.01); *B01D 2255/2065* (2013.01); *B01D 2255/2066* (2013.01); *B01D 2255/20738* (2013.01); *B01D 2255/40* (2013.01); *B01D 2255/9155* (2013.01); *B01J 23/10* (2013.01); *Y02T 10/22* (2013.01)

(56) References Cited

U.S. PATENT DOCUMENTS

2010/0282189 A1 11/2010 Ishimaru et al.
2011/0071019 A1 3/2011 Hanaki et al.

OTHER PUBLICATIONS

Rusu et al., "Destruction of Volatile Organic Compounds by Catalytic Oxidation", Environmental Engineering and Management Journal, vol. 2, No. 4, pp. 273-302 (2003).

* cited by examiner

NON-PGM CATALYST FOR BURNING CARBON SOOT, AND FILTRATION FILTER AND EXHAUST GAS POST-PROCESSING APPARATUS USING THE SAME

CROSS-REFERENCE TO RELATED APPLICATION

This application is a continuation-in-part of U.S. patent application Ser. No. 13/326,570, filed Dec. 15, 2011, which claims under 35 U.S.C. §119(a) the benefit of Korean Patent Application No. 10-2011-0103319 filed on Oct. 10, 2011, the entire contents of which are incorporated herein by reference.

BACKGROUND (a) Technical Field

The present invention relates to a non-PGM (platinum-group metals) catalyst for burning carbon soot having an improved oxidizing power at a low temperature, and a filtration filter and an exhaust gas post-processing apparatus using the same.

(b) Background Art

In recent years, an amount of exhaust gases exhausted from internal combustion engines are rapidly increasing due to a rapid increase in the number of vehicles. In particular, various substances contained in exhaust gases of diesel engines significantly influence the environment, and it is reported that soot in the exhaust gases can cause health issues, such as allergic disorders or decreased sperm count.

Thus, it is becoming an urgent research project to remove soot in exhaust gases. A commercialized soot removing apparatus includes a casing installed at an intermediate portion of an exhaust pipe connected to an exhaust manifold of an engine, and a filter (hereinafter, referred to as a "filtration filter") having fine cells mounted within the casing.

Then, carbon soot in exhaust gas discharged through an exhaust pipe during an operation of a vehicle is deposited on cell walls of a filtration filter, so it is necessary to regularly remove the carbon soot.

As well known in the art, excellent technologies for removing captured soot using a catalyst include a passive regeneration method using the oxidizing power of $NO_2$, and an active regeneration method of removing unburned hydrocarbons produced in an engine by generating oxidation heat in an oxidation catalyst and a filtration filter containing the oxidation catalyst.

In a method of removing captured soot, a high-priced platinum-based oxidation catalyst (platinum-group metal or PGM) is coated on a filtration filter to lower combustion temperature and improve fuel efficiency.

FIG. 1 is a schematic view for explaining a method of burning carbon soot by a DPF (Diesel Particulate Filter) catalyst using a PGM catalyst. As illustrated in FIG. 1, carbon soot filtrated by the DPF is burned when $NO_2$ contained in exhaust gas discharged from an engine and $NO_2$ oxidized by a catalyst, in which platinum (Pt) is coated on an alumina/mixture oxide, react with the platinum (Pt).

However, although a combustion temperature can be decreased by using a high-priced PGM such as platinum, the price of the catalyst is high, increasing the manufacturing costs of a vehicle.

Meanwhile, Japanese Patent No. 4144898 discloses a soot burning catalyst including a carrier consisting of a cerium-zirconium complex oxide containing 5 to 50 wt % of cerium oxide, and a first catalyst consisting of at least one of silver (Ag) and rubidium (Ru) impregnated in the carrier or its oxide and having 0.5 to 30 wt % of the carrier.

According to the Japanese patent, soot can be removed at a low temperature using an oxidation reaction without using a high-priced PGM.

Although the above Japanese patent discloses an advanced technology, considering that it does not use a PGM, there is still a need to improve a combustion efficiency of soot.

SUMMARY OF THE DISCLOSURE

The present invention provides a non-PGM catalyst which has an oxidizing power at a low temperature and improves fuel efficiency by decreasing combustion temperature.

The present invention also provides a filtration filter coated with a non-PGM catalyst having an improved natural regeneration efficiency, and an exhaust gas post-processing apparatus employing the filtration filter.

In one aspect, the present invention provides a non-PGM catalyst for burning carbon soot without using a noble metal, the non-PGM catalyst comprising: a cerium-praseodymium complex oxide and an iron oxide, the cerium-praseodymium complex oxide impregnated with silver (Ag), whereby the non-PGM catalyst which has an oxidizing power at a low temperature and improves fuel efficiency by decreasing combustion temperature.

In particular, the cerium-praseodymium complex oxide consists of 60 to 95 wt % of cerium oxide and 5 to 40 wt % of praseodymium oxide, and silver (Ag) impregnated in the complex oxide is 0.5 to 10.0 parts by weight of the total weight of the complex oxide.

The iron oxide is an oxide in a form of particles separate from the cerium-praseodymium complex oxide in which silver is impregnated, and is 0.5 to 10 parts by weight of the total weight of the cerium praseodymium complex oxide.

In another aspect, the present invention provides a filtration filter comprising: a plurality of through-cells formed regularly along an axial direction thereof and partitioned by cell walls, wherein each through-cell has an inlet port and an outlet port opened in opposite directions at opposite end sides thereof and a carbon soot burning non-PGM catalyst consisting of a cerium-praseodymium complex oxide (impregnated with silver (Ag)) and an iron oxide is coated on an upper surface and a lower surface of the cell wall.

The through-cell further comprises a carbon monoxide (CO) oxidizing catalyst for preventing generation of CO and slippage, the CO oxidizing filter being coated on a lower surface or an upper surface of the cell wall on which the carbon soot burning non-PGM catalyst or on an entire region of the lower surface or the upper surface of the cell wall.

In still another aspect, the present invention provides an exhaust gas post-processing apparatus wherein a DOC (Diesel Oxidation Catalyst) module, an LNT (Lean Nox Trap) module, or a TWC (Three Way Catalyst) module is mounted to an inlet port of a filtration filter coated with the carbon soot burning non-PGM catalyst consisting of a cerium-praseodymium complex oxide and an iron oxide, the cerium-praseodymium complex oxide impregnated with silver (Ag).

Accordingly, the non-PGM catalyst for burning carbon soot, and the filtration filter and the exhaust gas post-processing apparatus using the same have the following advantages.

Since a non-PGM consisting of a cerium-praseodymium complex oxide (impregnated with silver (Ag)) and an iron oxide is applied instead of a high-priced PGM, soot can be removed by an oxidation reaction at a lower temperature and combustion efficiency can be enhanced further as compared with the conventional technology.

BRIEF DESCRIPTION OF THE DRAWINGS

The above and other features of the present invention will now be described in detail with reference to certain exemplary embodiments thereof illustrated in the accompanying drawings which are given herein below by way of illustration only, and thus are not limitative of the present invention, and wherein.

DETAILED DESCRIPTION

Hereinafter, exemplary embodiments of the present invention will be described with reference to the accompanying drawings so that those skilled in the art can easily carry out the invention.

The present invention relates to a non-PGM catalyst which has an oxidizing power at a low temperature and improves fuel efficiency by decreasing combustion temperature.

The present invention also relates to a filtration filter coated with a non-PGM catalyst having an improved natural regeneration efficiency, and an exhaust gas post-processing apparatus employing the filtration filter.

First, some terms used in the specification will be defined hereinbelow, and the terms which are not specifically defined herein can be understood as those meanings which are generally used by those skilled in the art.

The term "soot" used herein generally refers to soot materials such as carbon-containing soot, sulfur-containing soot including sulfides, and polymer hydrocarbon soot.

The term "filtration filter" used herein includes a trapped (or wall-flow type) filtration filter and an opened (or straight-flow) filter. A representative trapped exhaust gas filter is a honeycomb structure (a diesel PM filter or DPF).

Simply referring to the operation principle of the filtration filter, the honeycomb filter has a plurality of cells extending along its axial direction, and soot is filtrated by cell walls 10 of the cells while exhaust gas passes through the filter. As a result, soot is removed from the exhaust gas.

Since soot is filtrated and deposited by the cell walls 10 of the honeycomb filter, pressure loss increases.

The term "pressure loss" used herein refers to a difference between exhaust gases at an inlet and an outlet for exhaust gas for the filter. A pressure loss is caused by a resistance due to the soot filtrated on the cell walls 10 of the filtration filter while exhaust gas passes through the filter.

In relation to the filter structure, necessary compositions may be coated on an upper side surface and a lower side surface of the filter wall having honeycombed cells. A "rear side" of the upper side surface or lower side surface of the filter wall used herein refers to a cell section located on an outlet side direction.

A "module" used herein refers to a honeycombed structure on which a certain catalyst is coated to process exhaust gas. For example, a CO oxidation module is a honeycombed structure where an oxidizing catalyst is coated to expedite a CO oxidation reaction.

A "diesel oxidation catalyst" module used herein is also referred to as a DOC (Diesel Oxidation Catalyst), and refers to a module on which platinum (Pt) and/or palladium (Pd) for reducing HC and CO contained in exhaust gas of a diesel engine by 80% are coated as a catalyst activating component.

An "LNT" module used herein refers to a module on which components such as Ba, Sr, and K for converting exhaust gas into nitrogen and carbon dioxide are coated after NOx is filtrated in a lean region with LNT (Lean NOx Trap) and is discharged in a dense region.

A "TWC (Three-Way Catalyst)" module used herein refers to a module on which exhaust gas CO and HO are coated in an oxidation reaction and NOx is coated in a reduction reaction, whereby a three-way catalyst is coated.

1. Soot Burning Catalyst

The non-PGM catalyst 11 for burning soot according to the present invention, in particular, the non-PGM catalyst which does not use a PGM include cerium-praseodymium complex oxides where silver (Ag) is impregnated.

Also, according to the embodiment of the present invention, the non-PGM catalyst 11 for burning soot may include iron oxides and cerium-praseodymium complex oxides where silver (Ag) is impregnated, and the iron oxides and the certium-praseodymium complex oxides where silver (Ag) are mixed to form a catalyst.

That is, the complex oxide particles where a silver component is impregnated and the iron oxide particles are mixed to form a catalyst.

The cerium-praseodymium complex oxide consists of 60 to 95 wt % of a cerium oxide and 5 to 40 wt % of a praseodymium oxide, and the silver component impregnated in the complex oxide is 0.5 to 10.0 parts by weight of the total weight of the complex oxide.

Also, more preferably, the Ag component impregnated in the complex oxides may be 1.5 to 3.0 parts by weight of the total weight of the complex oxides.

The iron oxide is an oxide in a form of particles separate from the complex oxide, and is 0.5 to 10 parts by weight of the total weight of the complex oxide.

Also, more preferably, the iron oxides may be 0.5 to 2 parts by weight of the total weight of the complex oxides.

Figure 1:
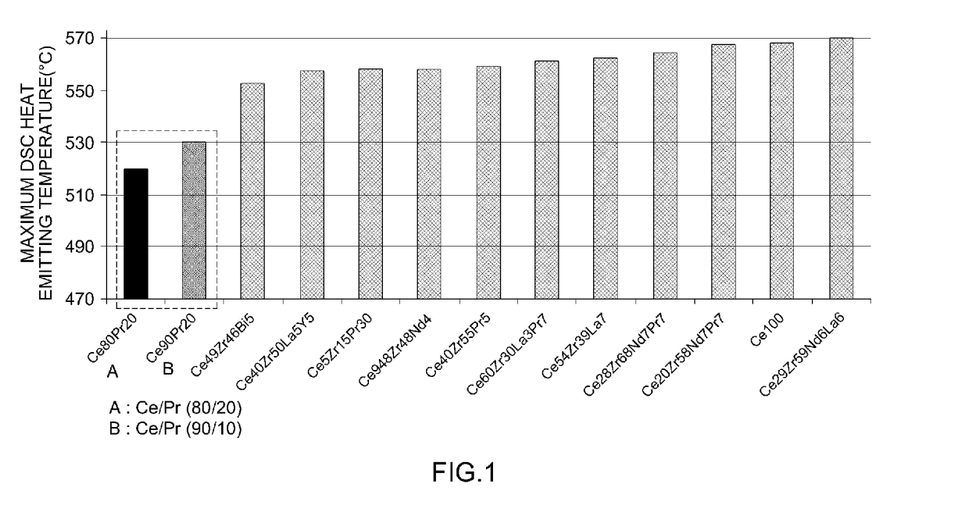
FIG. 1 illustrates a result of measuring burned carbon soot through a TGA/DSC for various complex oxides, wherein the samples are mixed with toner carbon (Printex-U) at a ratio of 5 to 1 in a condition of air flux of 50 ml (containing water)

The composition ratio of the metals and/or the oxides of the catalyst is totally based on experiments. FIG. 1 illustrates a preliminary experiment result for identifying components of complex oxides which exhibit efficient combustion results.

In the graph of FIG. 1, DSC is an acronym for Differential Scanning Calorimeter.

That is, an optimum complex oxide components and a composition ratio of FIG. 1 can be obtained by comparing a complex oxide (A) of 80 wt % of Ce and 20 wt % of Pr and a complex oxide (B) of 90 wt % of Ce and 10 wt % of Pr with various compositions and measuring soot burning capacities.

For example, the composition disclosed in Japanese Patent No. 4144898, i.e., the cesium-zirconium based complex oxide has a combustion temperature of approximately 500° C., but the cerium-praseodymium complex oxide can burn soot at a temperature of 530° C., which is a surprising result.

Silver of 0.5 to 10.0 parts by weight of the total weight of the complex oxide is impregnated in the cerium-praseodymium complex oxide.

Also, more preferably, Ag component may be included in the cerium-praseodymium complex oxide by 1.5 to 3.0 parts by weight thereof.

Figure 2:
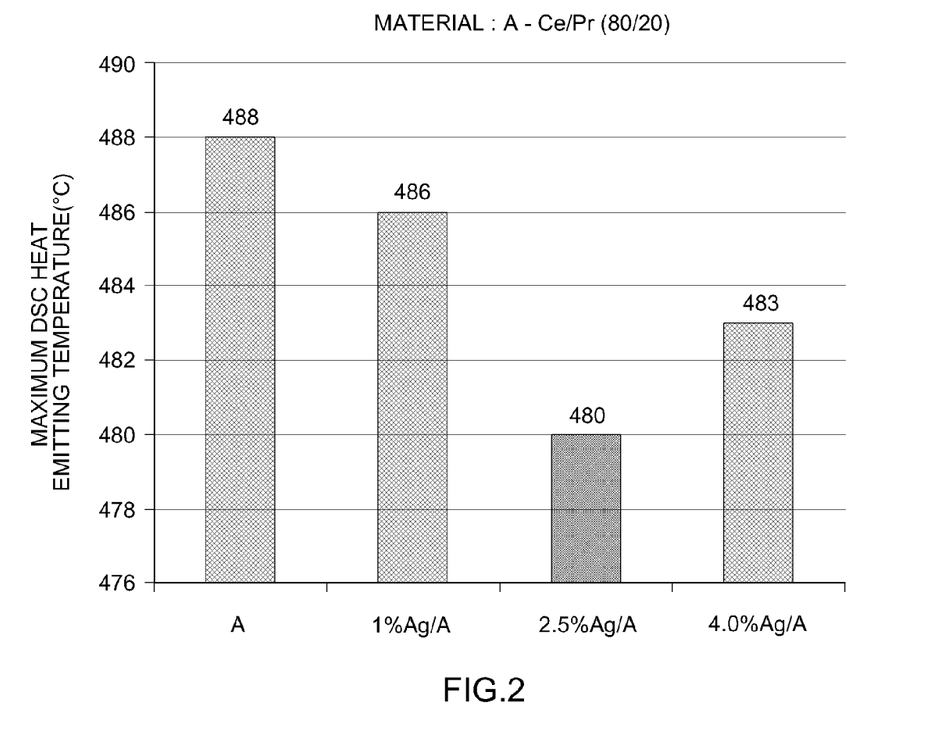
FIG. 2 illustrates a combustion assisting effect of silver impregnated in a cerium-praseodymium (80:20) complex oxide, wherein the measurement condition is the same as the measurement condition of FIG. 1 but diesel engine soot is used instead of toner carbon.

FIG. 2 is a TGA/DSC diagram showing a silver impregnating effect.

In this case, TGA is an acronym of ThermoGravimetric Analysis.

That is, when Ag component is impregnated in the cerium-praseodymium (80:20) complex oxide by 1.0 to 10.0 parts of weight, preferably, 1.0 to 4.0 parts of weight, and more preferably 2.5 wt %, combustion temperature becomes lowest, making it possible to further enhance combustion effect.

Without being limited to the theory, the silver impregnated in the complex oxide is recognized as a component for maximizing active oxygen species advantageous in oxidation of carbon soot.

The active oxygen species oxidize carbon soot to CO or $CO_2$ through a partial or full oxidation reaction.

However, surprisingly, the silver component does not increase combustion effect in proportion to an amount of the silver component added to the complex oxide, but forms a constant point of inflection in combustion effect. According to the present invention, when 2.5 wt % of silver is impregnated in the cerium-praseodymium (80:20) complex oxide, an inflection point of combustion efficiency is formed (see FIG. 2).

Moreover, the non-PGM catalyst 11 for burning carbon soot according to the embodiment of the present invention further comprises an iron oxide together with an Ag impregnated cerium-praseodymium complex oxide.

According to one or more embodiments of the present invention, the iron oxide is provided not in the form of a complex oxide integrally formed with the cerium-praseodymium complex oxide but in the form of separate particles.

That is, the combustion catalyst according to the present invention may have a form where the complex oxide particles in which the silver component is impregnated and the iron oxide particles are physically mixed.

The iron oxide is included in the complex oxide by 0.5 to 10 parts by weight, preferably, 0.5 to 2 parts by weight with respect to the total weight of the complex oxide.

Figure 3:
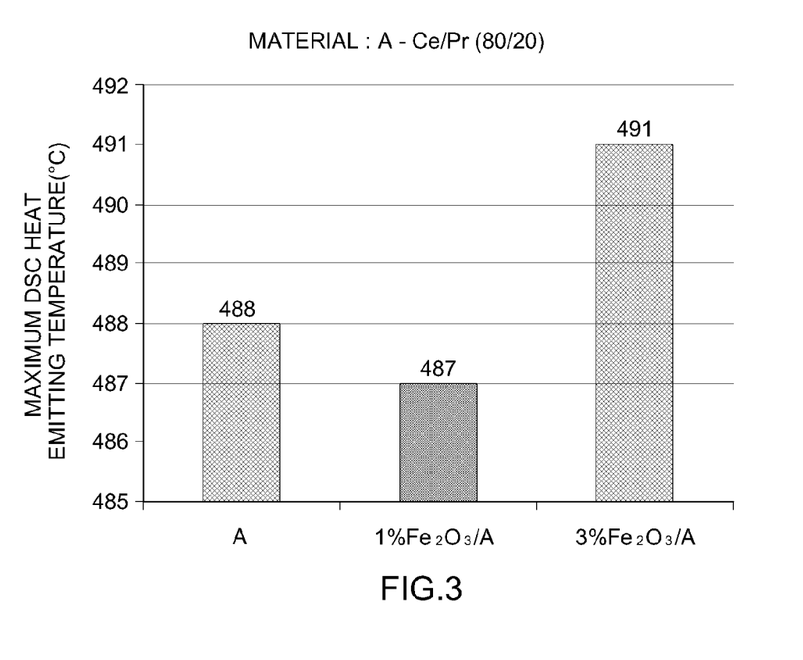
FIG. 3 is a TGA/DSC diagram showing the effect that an iron oxide in the form of second particles contained together with the cerium-praseodymium (80:20) complex oxide has on combustion, wherein the measurement condition is the same as the measurement condition of FIG. 4.

FIG. 3 is a TGA/DSC diagram showing a combustion effect due to addition of an iron oxide. That is, if 1.0 wt % of the iron oxide is impregnated in the cerium-praseodymium (80:20) complex oxide, the combustion effect is further enhanced. However, if 10 wt % of the iron oxide is impregnated, it seems that the combustion effect is not improved.

As an inflection point in the combustion effect exists in an amount of silver (Ag), it can be seen from FIG. 3 that an inflection point in combustion efficiency can be formed when approximately 2 wt % or more of the iron oxide is contained in the complex oxide.

Figure 4:
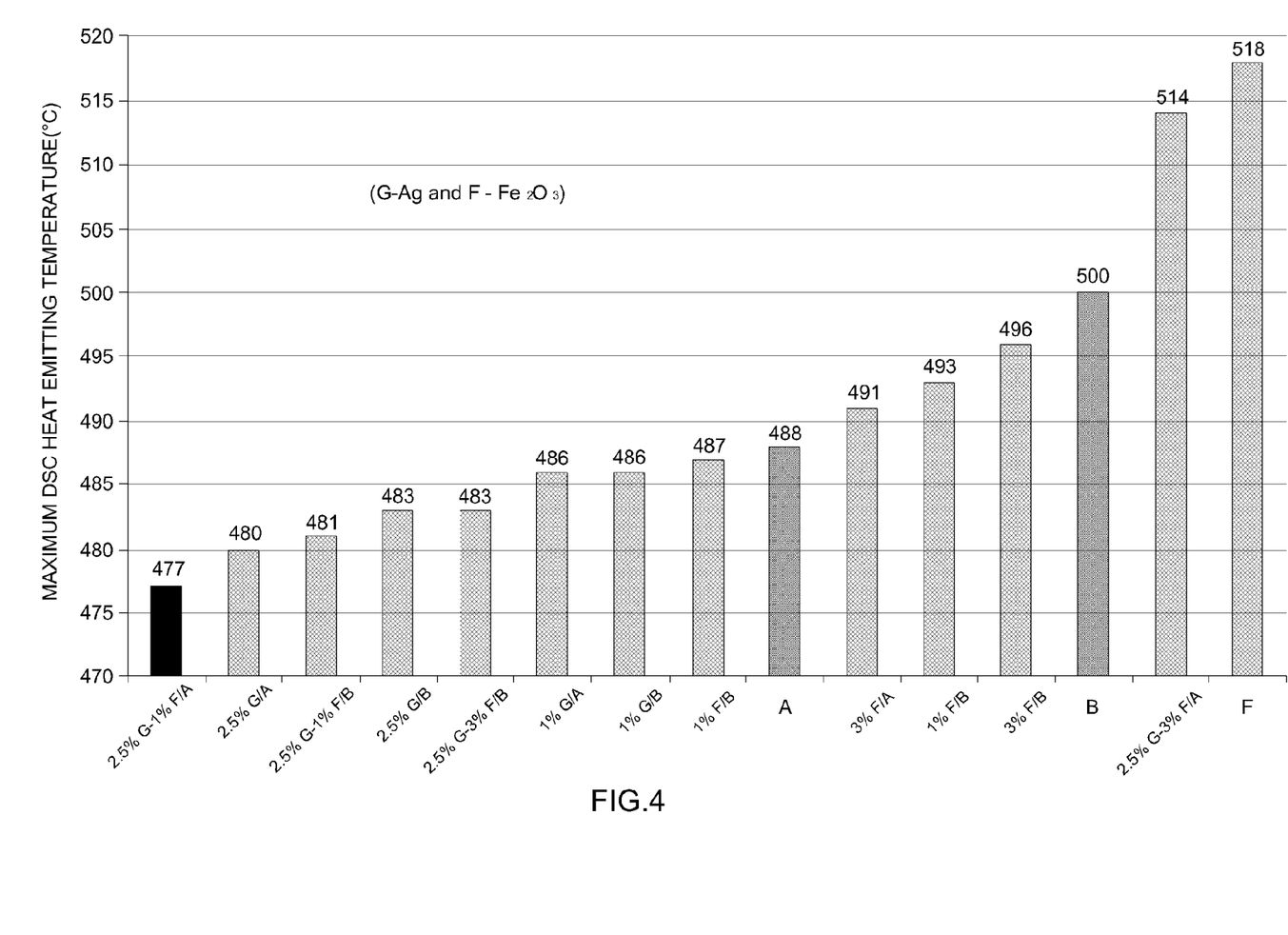
FIG. 4 illustrates a result of measuring burned carbon soot through a TGA/DSC for various complex oxides applied to the cerium-praseodymium (80:20, A, 90:10, B) complex oxide, wherein the samples are mixed with diesel engine soot at a ratio of 5 to 1 in a condition of air flux of 50 ml (containing water)

FIG. 4 is a graph obtained by measuring an activity of a catalyst consisting of a silver (Ag) impregnated cerium-praseodymium complex oxide.

That is, when silver (Ag) is impregnated in the cerium-praseodymium complex oxide and the iron oxide is mixed with the complex oxide, a synergy effect due to Ag and the iron oxide can be obtained.

It can be seen from FIG. 4 that the catalyst containing the silver impregnated cerium-praseodymium complex oxide and the iron oxide enhances combustion efficiency due to the unexpected synergy effect due to the silver component and the iron oxide as compared with the cerium-praseodymium complex oxide, the silver impregnated cerium-praseodymium complex oxide, or the cerium-praseodymium complex oxide containing the iron oxide.

2. Soot Filtration Filter

Figure 5:
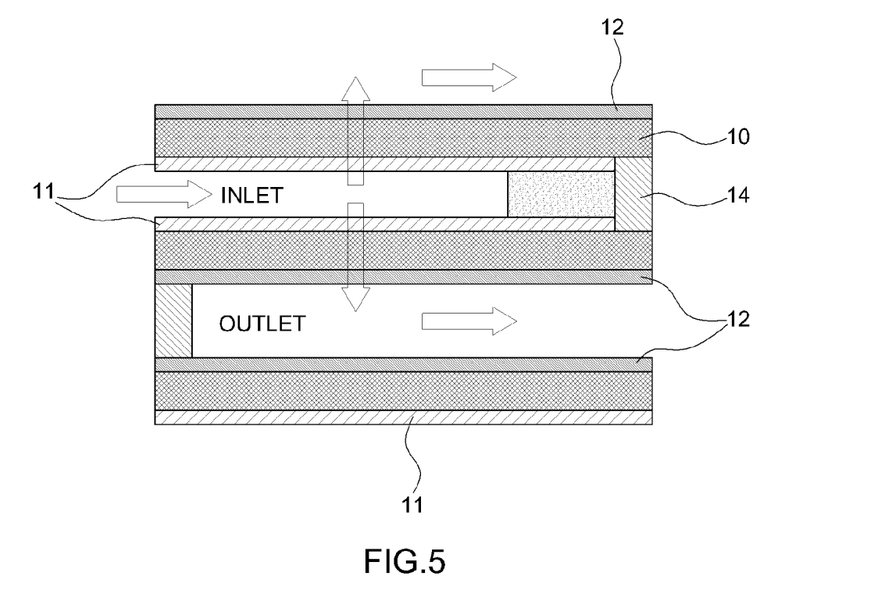
FIG. 5 is a view schematically illustrating a state where a soot burning non-PGM catalyst is coated on a filtration filter according to the present invention.

As illustrated in FIG. 5, the filtration filter according to the present invention may have a soot burning non-PGM catalyst coated on an upper surface and a lower surface of a filter wall.

To achieve this, the soot burning non-PGM catalyst 11 may further comprise silica ($SiO_2$), alumina ($Al_2O_3$), or zirconia ($ZrO_2$) as a binder component.

The filter applied to the present invention is not specifically limited, but a soot filtrating honeycomb filter for a diesel engine is exemplified for simplicity.

Figure 6:
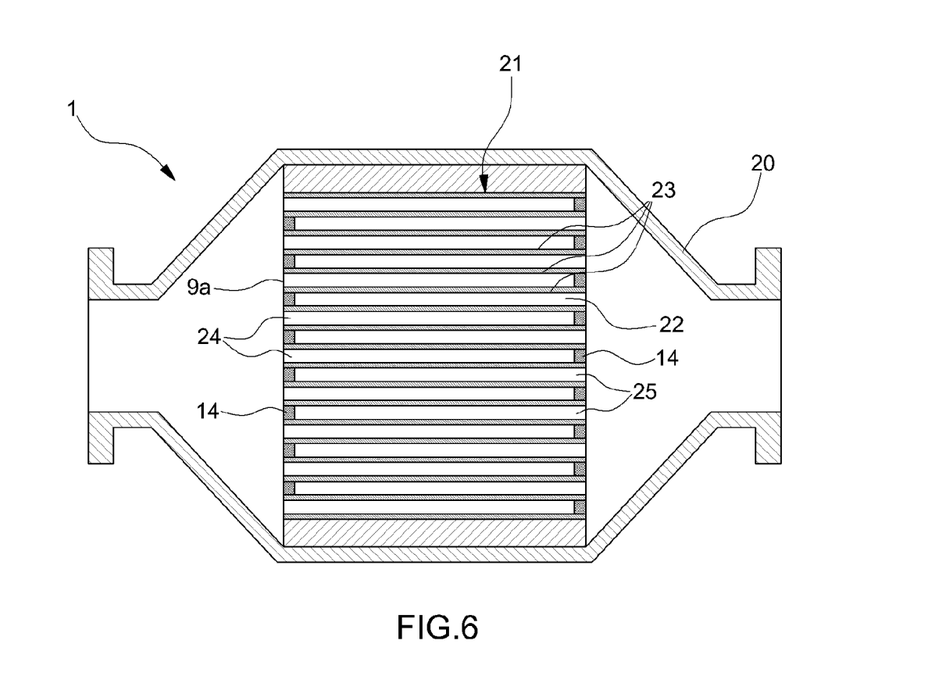
FIG. 6 is an enlarged sectional view of a honeycomb filter where a typical cylindrical ceramic filter catalyst structure is mounted to a casing.

FIG. 6 is an enlarged sectional view of the honeycomb filter where a typical cylindrical ceramic filter catalyst structure 21 is mounted to a casing 20.

The ceramic filter catalyst structure has a plurality of through-cells 22 having a substantially square shape and formed regularly along an axial direction thereof, and the through-cells 22 are partitioned by thin cell walls 10.

In this case, the entire cross-section of the filter structure has a shape of a chess board.

Generally, the density of the cells is designed to be approximately 200 to 300 cells/in$^2$, and the thickness of the cell wall 10 is approximately 0.3 mm.

A plurality of inlet ports 23 are formed on one side of the plurality of through-cells 22 and a plurality of outlet ports 25 are formed on an opposite side thereof. The inlet ports 23 and the outlet ports 25 are opened in opposite directions, and the opposite sections of the inlet ports 23 and the outlet ports 25 are sealed by a sealing material 14.

The soot burning non-PGM catalyst 11 according to the present invention is coated on the upper or lower surface of the cell wall 10.

Although a catalyst coating method has been illustrated, the present invention is not limited thereto.

In the catalyst coating method according to the embodiment of the present invention, the catalyst powder according to the present invention forms a slurry together with a binder component such as alumina sol and water.

The slurry is coated on the filter cell wall 10 through a general dipping method and is plasticized.

In order to prevent generation of CO and slippage which can be potentially generated due to an incomplete oxidation reaction of the non-PGM combustion catalyst according to the present invention, the soot filtration filter of the present invention is further coated with the CO oxidation catalyst 12 consisting of a platinum-based element on an entire region of a lower or upper surface of the cell wall 10, or a section of the outlet side on a side opposite to the soot burning non-PGM catalyst 11 (see FIG. 5).

Alternatively, the soot filtration filter of the present invention may have a CO oxidation catalyst 12 module spaced apart from or in contact with a rear end of the filter.

3. Exhaust Gas Post-processing System

Figure 7:
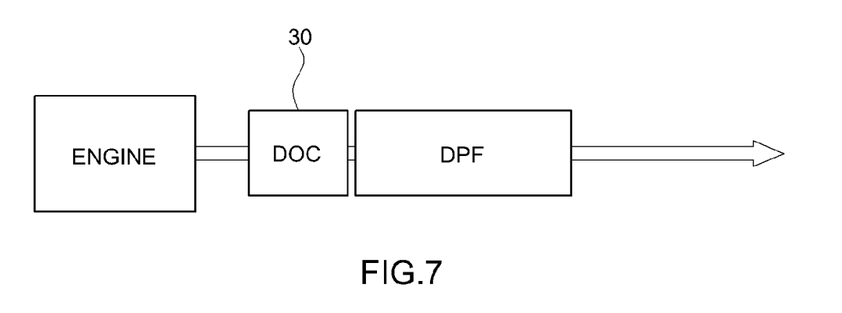
FIGS. 7 and 8 are views schematically showing a post-processing/purifying system where a DOC or LNT module is attached to a front end of the filtration filter (0 g/ft3) which does not contain a PGM.
Figure 8:
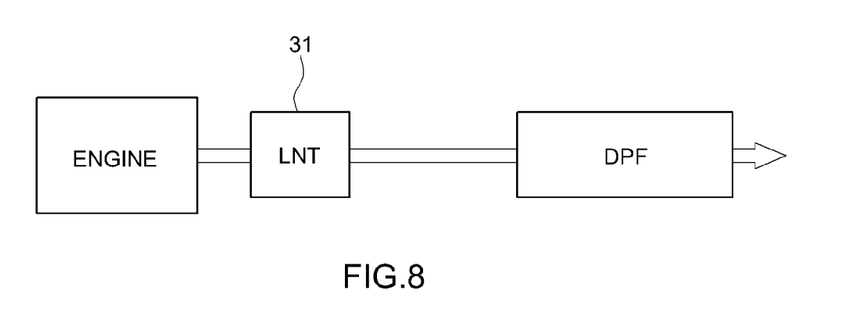

According to the present invention, as illustrated in FIGS. 7 and 8, an exhaust gas post-processing/purifying system where a DOC 30 module, an LNT 20 module, or a TWC module is mounted to an inlet port of the filtration filter coated with the non-PGM catalyst is provided.

The DOC 30, LNT 31, and TWC modules correspond to the modules of the exhaust gas post-processing/purifying system generally understood by those skilled in the art.

Hereinafter, the present invention will be described in more detail with reference to the following embodiment, but the present invention is not limited to the embodiment.

Exemplary Embodiment

First, after silver nitrate as an Ag precursor is diluted with a large amount of distilled water, it is impregnated in CePrO$_2$ (80:20) powder (A), is dried at 120° C. for four hours, and is plasticized at 450° C. for two hours to manufacture an AG/CePrO$_2$ (2.5 wt % Ag/A).

Al$_2$O$_3$ is mixed with the complex oxide with Fe$_2$O$_3$ powder (1.0 wt %) and a binder and the mixture is wet-milled to an average particle size of 7 μm to manufacture a slurry.

The manufactured slurry is impregnated in the DPF in a dipping method, is dried at 120° C., and is plasticized at 450° C. for one hour to finish the filtration filter of the present invention.

Comparison Examples

A commercial filtration filter where a PGM is applied as a catalyst is used.

The PGM used in the comparison example has a density of 26.7 g/ft$^3$ and has a ratio of 2Pt/1Pd.

Comparison Example 1 uses a filtration filter where a high-density PGM is coated at a front end section of the DPF cell wall and a low-density PGM is coated at a rear end section of the DPF cell wall, Comparison Example 2 uses a filtration filter where a intermediate-density PGM is coated at the entire section of the DPF cell wall, and Comparison Example 3 uses a filtration filter where a intermediate-density PGM is coated at the entire section of the DPF cell wall.

Experimental Example of Engine

After being aged at 800° C. for 10 hours, the filtration filter is hung at a rear end of the DOC. The carbon soot is loaded at 8 g/L (an amount of filtrated carbon soot per unit volume of the filtration filter) in a transient mode where an engine condition (RPM and torque) simulating an actual road travel is changed, and the engine condition for evaluation of regeneration is set to a target temperature of 620° C. and 560° C. so as to control an inlet temperature of the filtration filter through control of a post-injected amount of an engine at 2000 RPM/40 Nm.

The regeneration efficiency of carbon soot is determined by a DPF weight before the experiment and a DPF weight after the regeneration, and the regeneration efficiency at 620° C. and the regeneration efficiency at 560° C. are listed in Tables 1 and 2 respectively.

TABLE 1

| Constitution of Catalyst | Soot Regeneration Efficiency (%) at DPF 620° C. |
|---|---|
| Embodiment (non-PGM) | 80.5 |
| Comparison Example 1 (high-density and low-density PGM) | 75.9 |
| Comparison Example 2 (intermediate-density PGM) | 78.4 |
| Comparison Example 3 (intermediate-density PGM) | 87.4 |

TABLE 2

| Constitution of Catalyst | Soot Regeneration Efficiency (%) at DPF 560° C. |
|---|---|
| Embodiment (non-PGM) | 49.0 |
| Comparison Example 1 (high-density and low-density PGM) | 25.0 |
| Comparison Example 2 (intermediate-density PGM) | 46.0 |
| Comparison Example 3 (intermediate-density PGM) | 54.0 |

As listed in Tables 1 and 2, the soot burning non-PGM catalyst according to the present invention shows a result corresponding to the commercial filtration filters to which PGMs are applied in the actual engine experiments.

That is, considering that the conventional filtration filters contain PGMs and their prices are high, the soot burning non-PGM catalyst which can be manufactured at low costs according to the present invention shows a considerably improved combustion efficiency.

Thus, according to the present invention, since a non-PGM including a cerium-praseodymium complex oxide impregnated with silver (Ag) and an iron oxide mixed therein is applied instead of a high-priced PGM, soot can be removed by an oxidation reaction at a lower temperature and combustion efficiency can be enhanced further as compared with the conventional technology.

What is claimed is:

1. A non-PGM catalyst for burning carbon soot without using a noble metal comprising:
   a cerium-praseodymium complex oxide impregnated with silver (Ag); and
   an iron oxide that is mixed with the cerium-praseodymium complex oxide impregnated with the silver (Ag),
   wherein the cerium-praseodymium complex oxide comprises 60 to 95 wt % of cerium oxide and 5 to 40 wt % of praseodymium oxide, and the silver (Ag) impregnated in the complex oxide is 0.5 to 10.0 parts by weight of the total weight of the complex oxide,
   wherein the iron oxide is an oxide in a form of particles separate from the cerium-praseodymium complex oxide in which the silver is impregnated, and is 0.5 to 10 parts by weight of the total weight of the cerium praseodymium complex oxide.

2. The non-PGM catalyst of claim 1, further comprising silica, alumina or zirconia as a binder component.

* * * * *